United States Patent Office 2,797,412
Patented June 25, 1957

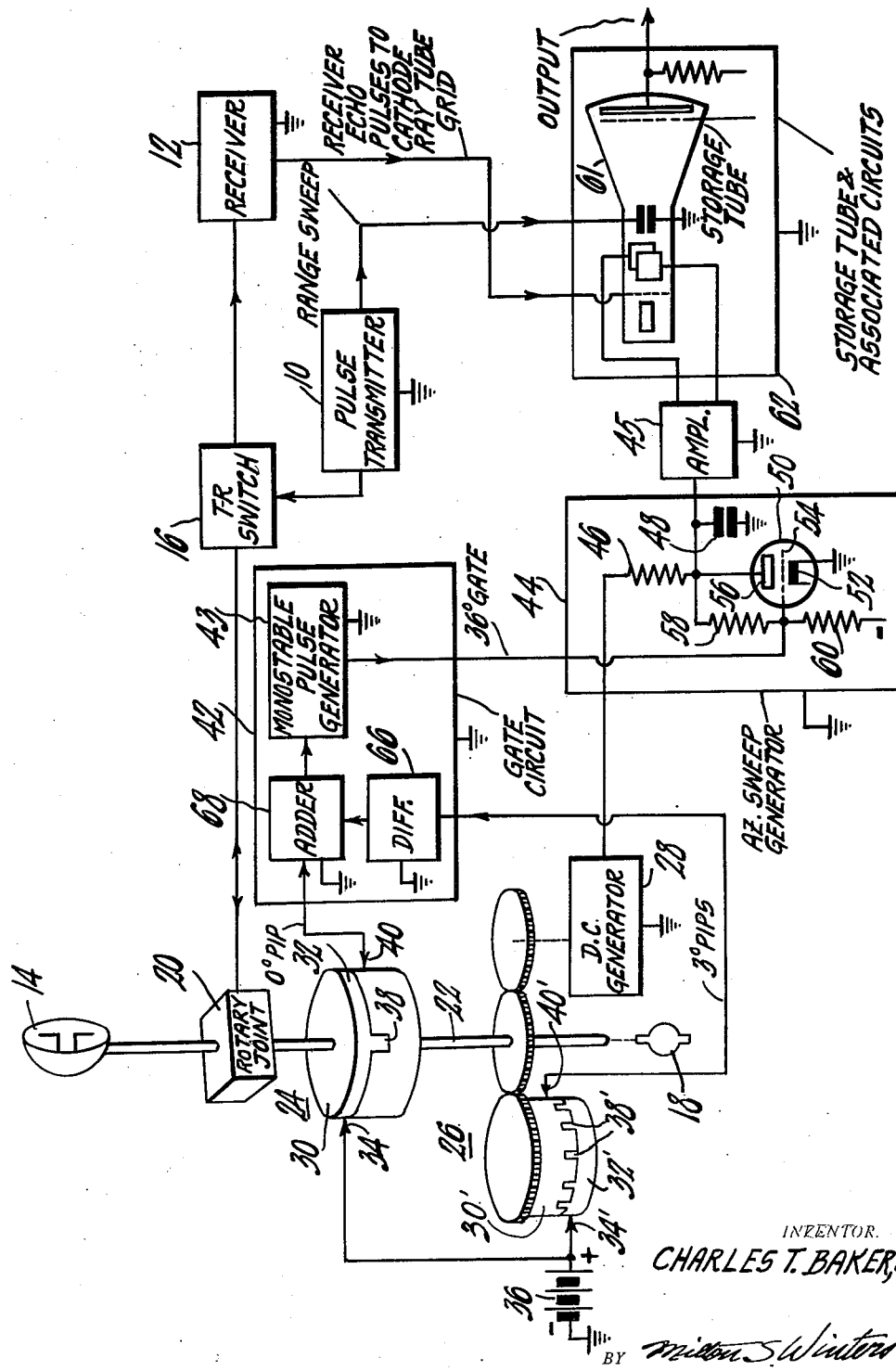

---

2,797,412

SECTOR SWEEP CIRCUIT

Charles T. Baker, Jr., Wappingers Falls, N. Y., assignor, by mesne assignments, to the United States of America as represented by the Secretary of the Army Application March 20, 1953, Serial No. 343,715

8 Claims. (Cl. 343—11)

---

The present invention is related to sector sweep circuits for storage tubes or display circuits in pulse radar systems. Radar is defined herein as radiation echo detection and ranging.

In certain pulse radar systems an indication of moving targets to the exclusion of stationary targets is secured by using a storage tube. The received signals may be stored on the storage tube target by the beam of the tube sweeping a raster in which range is one coordinate and angle is another coordinate. An example of such a raster is the so-called "B" scan. Each point of the tube storage target thus corresponds to a point of the area scanned by the radiation energy of the radar set. In the first scans of the area a storage pattern is developed on the tube storage target corresponding to the echoes received from the scanned area. On subsequent scans, any change in echoed energy from a target in the area scanned results in a change in this charge pattern. From this changed charge pattern a signal is developed. It is apparent that moving objects cause such changes which result in signals, whereby the moving target can be located and tracked.

Unfortunately, the resolution of the storage tube targets as presently made, and especially those targets of the tube known as the Radechon, which is presently most useful for the purpose, is not as high as is sometimes desired. The size of the target, and hence of the tube, might be increased to give a desired resolution over an entire 360° area of scan about the radar antenna. However, such increase of size is sometimes impractical. Accordingly, it is desirable to limit the sector being scanned for moving objects. If the sector is thus limited, however, it is desirable to be able to scan any selected area or sector of limited angular extent. Particularly is such selection desirable where the moving object indication is sought in conjunction with a radar system having an antenna scanning a complete 360° with continuous rotary motion.

It is an object of the present invention to provide a sweep voltage for a cathode ray tube corresponding to a selected sector of predetermined angular extent.

It is a further object of the present invention to provide a novel means for selecting such a sector.

It is another object of the invention to improve moving target indication radar systems.

It is a further object of the invention to improve the resolution of moving target indication systems of the type employing a storage tube, and especially of the so-called area moving target indication systems.

A further object of the invention is to provide a sweep voltage of improved accuracy linear with angle and corresponding to a selected sector of predetermined angular extent.

In accordance with a preferred form of the invention, a pair of commutators are driven by the scanning antenna drive. One commutator has a brush or contact which picks up a voltage pulse only once for each revolution of the commutator armature. The other commutator has a brush or contact which picks up voltage pulses repeatedly a number of times at least as great as the total scan of 360° is divisible by the angular extent of the sector to be examined for moving targets. The commutator contacts are adjustable, so that the voltage pulse caused by the first contact pick-up may coincide with that caused by the second contact pick-up when the antenna initiates scan of any desired sector. A gate circuit is controlled by the coincidence of the pulses. The gate circuit produces a gate having a time duration equal to that required for the antenna to scan the predetermined sector angle. The voltage derived from this gate circuit controls the time duration of the sweep voltage from a sweep voltage generator.

Moreover, according to the invention, the rate of change of the sweep voltage is made proportional to the antenna rotational velocity. This proportionality is accomplished by using, as the source of the charging voltage for a capacitor across which the sweep voltage is developed, a voltage from a D.-C. (direct current) generator driven by the antenna shaft. Thus reasonable small variations in antenna speed cause a like variation in rate of change of sweep voltage. Accordingly, the displacement of the storage tube electron beam is corrected or compensated so that displacement along the angular coordinate always corresponds closely to the angular position of the antenna pattern within the selected sector.

The foregoing and other objects, advantages and novel features of the invention will be more fully apparent from the following description, when taken in connection with the accompanying drawing, in which the sole figure is a schematic representation of a preferred embodiment of the invention employed in a radar system of the radiant energy type.

Referring to the drawing, a radar system includes a pulse transmitter 10, a receiver 12, and an antenna 14. A T-R (transmit-receive) switch 16 couples the transmitter 10 to the antenna 14 during transmit periods, and couples the antenna 14 to the receiver 12 during non-transmit or receive periods. The antenna 14 may be of the type employing a parabaloid reflector. The antenna is rotatably driven by an antenna drive motor 18. The coupling between antenna 14 and T-R switch 16 may be made by a so-called rotating joint of any of the known types suitable for the system.

The drive motor 18 drives the antenna 14 by a suitable shaft 22. To the shaft 22 are coupled the rotors of a first commutator 24, a second commutator 26, and a D.-C. generator 28. The first commutator may take the form of a right-cylindrical rotor drum 30 with a dielectric surface driven about the drum axis. A band or circle of metal about the drum is in continuous contact, as a slip ring, with a brush 34 (schematically indicated) which receives voltage from any suitable source indicated at 36.

A segment of the cylindrical dielectric surface is covered by a metal strip or element 38 extending axially from the metal band 32 and connected thereto. A brush or contact 40 is in position to be intermittently contacted by the element 38 in its rotation.

The second commutator 26 is similar in construction to the first commutator 24. Corresponding parts are indicated by like reference numerals differentiated by primes from those applied to the first commutator 24 parts. However, instead of a single contact segment or element, there are a plurality of elements 38' connected to the band 32'. The commutators each make one revolution for a single antenna revolution. Therefore, they could be mounted on a single shaft or drum (not shown) if desired.

The contacts 40 and 40' are each connected to a gate circuit 42. The gate circuit 42 may include a differentiator circuit 66, of the usual resistor-capacitor combination type, to receive the voltage from contact 40'. If desired, the differentiator circuit 66 may be considered as part of the pulse forming means which includes the second commutator 26. The gate circuit 42 may also include an add circuit 68 (which may be of the usual resistor network type) to receive and add the voltages from the differentiator 66 and from the contact 40. The remainder of the gate circuit 42 may include any suitable monostable pulse generator 43, to which the add circuit 68 output is applied, for example, an Eccles-Jordan circuit or variation thereof, having a suitable threshold voltage. In such a circuit if the threshold voltage is exceeded by an incoming applied pulse, a single output pulse is generated. Such monostable pulse generators are well known. See, for example, "Waveforms," vol. 19 of the Radiation Laboratory Series, chapter 5, in which various monostable multivibrators are disclosed.

The gate circuit output is applied to control an azimuth sweep generator 44, which is shown in a simplified form. As shown, the azimuth sweep generator 44 includes a series resistor-capacitor combination of resistor 46 and capacitor 48 connected between the common ground connection (conventionally indicated) and the D.-C. generator 28. The capacitor is paralleled by a normally closed switch in the form of an electron discharge tube 50 having a cathode 52, a control element or grid 54 and an anode 56. The grid 54 is biased to a normally conductive state by a voltage divider system comprising resistor 58 and grid resistor 60 connected serially between the positive polarity D.-C. voltage from D.-C. generator 28 and a suitable negative polarity voltage (or to ground if the requisite resistor values to meet all design requisites is satisfied). The grid 54 is connected to the junction of the voltage divider resistors 58 and 60. The gate voltage from gate circuit 42, assumed to be in the form of a negative going pulse is connected to grid 54. This pulse "opens" the switch tube 50, that is, makes it non-conductive for the pulse period. If desired, the output from the azimuth sweep generator 44 may supply signal to an amplifier 45 with a push-pull output, to avoid the defocusing of the beam often associated with single-ended output.

A sawtooth waveform having a duration of the pulse period is developed across capacitor 48. This sawtooth waveform is applied to one set of the deflection plates of the storage tube 61, of the storage tube and associated circuits 62. It will be understood that there is included the power supply and other circuitry required to make the tube operative, although these are indicated only by legend. The range sweep may be developed in the pulse transmitter 10 and is applied to the other set of deflecting plates of storage tube 61. The received echo pulses, demodulated in receiver 12 are applied to the storage tube 61 grid to control the beam intensity.

In operation, it is desired that each range sweep of the storage tube beam on the storage tube target corresponds to an exploratory pulse transmitted from the antenna. The range sweep lines are preferably closely adjacent but separated by not less than the beam width where the beam strikes the storage target. At the present development of storage tubes, only about 120 such adjacent lines may be swept on a single storage tube target. Assume the antenna to be rotated at 10 revolutions per minute (merely by way of example) and assume a pulse repetition frequency of 200 C. P. S., also by way of example. Under the assumed conditions, 120 pulses would correspond to 36° of scan. It may be assumed for the sake of simplicity in description, that each of the rotor drums 30 and 30' of the commutators is driven at a one-to-one ratio with the antenna drive shaft 22. Accordingly, under the assumed conditions one element 38 is provided on drum 40 and 10 elements 38', equally angularly spaced, are provided on drum 30'. The rotational rate of the drum 30 may be increased or that of drum 30' increased or decreased, by changing the drive or gear ratios. In such event, the number of strips 30 or 30' must be proportionately increased or decreased. In any event, the contact 40 receives voltage from source 36 once each complete revolution of the antenna. The contact 40' receives voltage from the source 36 once every 36° of antenna rotation.

Preferably, the element 38 contacts the contact 40 over slightly more than a 36° sector. The differentiator 66 supplies a pulse, for example at the instant of make of contact 49' with the strips 38'. The pulse from contact 40 which lasts over a 36° rotation of antenna 14 is added to the pulse from differentiator 66 in the add circuit 68. The gate circuit bias is overcome only on the occurrence of the make of contact 40' in coincidence with a pulse from contact 40.

To give selection of any desired 36° sector, the contact 40' is preferably positionable at any point for a full 360° around the axis of drum 30'. The rotor strip 38 of drum 30 is then preferably of at least 36° angular width. The differentiated pulses from contact 40' are added to the undifferentiated positive going pulse from contact 40 in the addition circuit 42. The resultant wave shape is a positive pulse from contact 40 on each revolution with one of the differentiated pulses (the positive going one from the leading edge of the voltage picked up by contact 40') superimposed on it. The negative going pulse from the differentiator may be ignored, because the threshold of the gating circuit is readily arranged so that only the super-imposed positive pulse exceeds the threshold.

The angular width of strip 38 is sufficient to always assure super-position of at least one of the positive going differentiated pulses on the square wave voltage from contact 40. To avoid ambiguity, the contact 40 may be made positionable for a limited angular sector of a few degrees around the drum 40 axis. The contact 40' may be calibrated, and the 36° gate initiated at any desired point in the 360° rotation of the antenna.

The gate signal from the gate circuit 42 is applied to control the switch tube 50. The gate cuts off the switch tube during 36° of antenna rotation. During this cut-off period, the capacitor 48 charges through resistor 46 at a substantially linear rate. At the termination of the gate pulse, the tube 50 becomes conductive, and the capacitor 48 discharges through the tube 50. As a result, a single sawtooth wave starts at each gate pulse inception, and terminates at the gate pulse termination. The time duration of this sawtooth wave is therefore under control of the gate circuit. This sawtooth wave controls the sweep in the storage tube which corresponds to angle deflection. As mentioned before, this deflection may be along one rectangular coordinate.

Although the antenna 14 is driven at a nominally constant angular rate of rotation by the drive motor 18, fluctuations in voltage supply and variations in the wind resistance or other frictional forces cause variations in the angular rotational rate. However, the charging supply for the capacitor 48 is supplied from the D.-C. generator 28. Therefore, by this feature of the invention the sawtooth wave voltage from the capacitor is increased for higher and decreased for lower angular rotational rates. Thus a suitable compensation is afforded for the increased or decreased rates. The result is that the deflection of the storage tube beam is displaced at a rate so that in each raster swept, the beam is accurately placed along the angle deflection coordinate at a point corresponding to the antenna position in the selected 36° sector. It may be true that the gate pulse then corresponds to more or less than exactly 36°. However, preferably the gate pulse is slightly larger, say to correspond to 38° at the nominal rate. At slower angular rotation rates, the gate pulse has the same time duration, thus at the slowest antenna angular rotation rate contemplated, the time duration of the gate pulse is still long enough to last for 36° of antenna rotation. If now the sweep at such rate is arranged to just completely cover the storage target in the antenna angle coordinate, the only effect of the slower rate is to cause the sweep in the azimuth coordinate on the tube storage target to be slower, due to the lower charging voltage from generator 28. The voltage from generator 28 is, of course, always proportional to the angular rotation drive rate. Therefore, the sweep or deflection in the azimuth coordinate of the tube target may be made to always correspond with great exactness to the antenna position in the selected 36° sector.

It is apparent from the foregoing description that the invention provides an improved sweep circuit for pulse radar systems using storage tubes, employing commutators to initiate action of a sweep circuit for any selected sector out of the 360° swept by an antenna, and using an antenna driven D.-C. generator to supply the charging voltage for the sawtooth generator storage capacitor to secure improved accuracy.

What is claimed is:

1. In a radar system including a directive antenna, the combination comprising a continuously rotatable shaft for said antenna, first and second commutators each mechanically coupled to said shaft, two electrical pulse forming means each comprising a different one of said commutators, and a gate circuit connected to each said pulse forming means and responsive to pulse coincidence to produce a gate pulse output.

2. The combination claimed in claim 1, further comprising a direct current generator mechanically coupled to said shaft, and a sweep voltage generator connected to said D.-C. generator and to said gate circuit and having a sweep voltage output responsive in rate of change to the D.-C. generator output and responsive in time duration to said gate circuit output.

3. In a radar system including a directive antenna, the combination comprising a continuously rotatable antenna shaft for said antenna, first and second commutator means each mechanically coupled to said shaft, two means to form electrical pulses each comprising a different one of said commutators and one said last named means comprising a differentiator, a gate circuit connected to each said pulse forming means and responsive to coincidence of said pulses to produce a gate pulse output.

4. In a radar system including a directive antenna, the combination comprising a continuously rotatable antenna shaft for said antenna, first and second commutator means each mechanically coupled to said shaft, the second having a greater number of segments than the first, a first means to form electrical pulses and including said first commutator, a second means to form electrical pulses and including said second commutator and further including a differentiator, a gate circuit connected to each said pulse forming means and responsive to coincidence of said pulses to produce a gate output pulse.

5. The combination claimed in claim 4, further comprising a sweep voltage generator connected to said gate circuit and having a sweep voltage output responsive in rate of change to a direct current voltage and a time duration responsive to the gating voltage from said gate circuit, and a direct current generator mechanically coupled to said shaft and connected to said sweep voltage generator to apply a direct current voltage thereto to which the sweep voltage rate of change is responsive.

6. The combination claimed in claim 4, further comprising a direct current generator mechanically coupled to said shaft, a sweep voltage generator under control of said gate circuit and including a capacitor connected to receive its charging voltage from said direct current generator and across which capacitor the sweep voltage of said sweep voltage generator is developed.

7. A pulse radio echo detection and ranging system comprising a continuously rotatable antenna, an antenna shaft, a first commutator and a second commutator each coupled to said shaft, each commutator having a rotor with a slip ring and one or more segments connected to the slip ring, a slip ring brush and a segment contact, a voltage source connected to each slip ring brush, the said rotor couplings affording one segment contact to be made once each revolution by the first commutator contact, and affording an integral number greater than one segment contacts to be made once each revolution by the second commutator contact, a gate circuit responsive to a predetermined threshold voltage at its input, a differentiator connected to said second commutator segment contact, an addition circuit connected to said first commutator segment contact and to said differentiator to add the voltages therefrom and having an output applied to the input of said gate circuit, an azimuth sweep generator comprising a charging capacitor and generating a sweep voltage across said capacitor the time duration of which is under control of said gate circuit, a cathode ray tube having an electron beam intensity control and an electron beam deflectable in each of two different coordinates in response to a different one of two sweep voltages, said capacitor being connected to provide one of said two sweep voltages, a pulse transmitter including means to provide a range sweep voltage applied to said tube as the other of said two sweep voltages, said pulse transmitter being connected to said antenna to radiate therefrom its pulse energy of transmission, a receiver connected to said antenna to receive echoed pulses and connected to said cathode ray tube control to control the beam intensity thereof.

8. The system claimed in claim 7, said cathode ray tube being a storage tube.

References Cited in the file of this patent

UNITED STATES PATENTS

| | | |
|---|---|---|
| 2,524,295 | Mesner | Oct. 3, 1950 |
| 2,572,975 | Berger et al. | Oct. 30, 1951 |
| 2,600,255 | McConnell | June 10, 1952 |
| 2,654,085 | Goldstein | Sept. 29, 1953 |